United States Patent [19]
Bradley

[11] 4,094,214
[45] June 13, 1978

[54] WIRE INSULATION STRIPPING DEVICE

[75] Inventor: Marion W. Bradley, Paradise, Calif.

[73] Assignee: Farinon Electric, San Carlos, Calif.

[21] Appl. No.: 597,240

[22] Filed: Jul. 18, 1975

[51] Int. Cl.² .............................................. H02G 1/12
[52] U.S. Cl. .................................................. 81/9.5 R
[58] Field of Search ................ 81/9.5 R, 9.5 B, 9.5 C, 81/43, 9.5 A; 30/90.1, 91.2; 29/751-763; 72/412, 411

[56] References Cited

U.S. PATENT DOCUMENTS

| | | | |
|---|---|---|---|
| 2,386,328 | 10/1945 | Rollings | 81/9.5 R |
| 2,889,728 | 6/1959 | Hindenburg | 81/9.5 A |
| 2,894,424 | 7/1959 | Vaughan | 81/9.5 R |
| 3,151,509 | 10/1964 | Gormley | 81/9.5 R |
| 3,532,011 | 10/1970 | Bradley | 81/9.5 C |

FOREIGN PATENT DOCUMENTS

| | | | |
|---|---|---|---|
| 1,324,321 | 7/1973 | United Kingdom | 81/9.5 R |

Primary Examiner—James L. Jones, Jr.
Assistant Examiner—Roscoe V. Parker
Attorney, Agent, or Firm—William C. Babcock

[57] ABSTRACT

A light weight, portable device for stripping a section of tough, resilient electrical insulation from a free end portion of a wire to expose the electrical conductor previously enveloped by the sheath section. The section of the sheath enveloping the end portion is severed from the balance of the sheath by radially compressing a thin longitudinal sheath section through substantially the entire periphery thereof to form the section into one that has an extremely thin wall. When the sheath section is so compressed, the device is moved longitudinally and parallel to the wire in a direction to tension the compressed wall section to the extent it breaks, and longitudinal movement of the device being continued to slide the severed sheath section from the end portion of the electrical conductor to expose the latter. Stops are provided on the device to prevent the latter coming into contact with the electrical conductor during the compression of the sheath section. Contact of portions of the device with the electrical conductor during such compression is undesirable, and could give rise to a nick or the like in the conductor that under stress may serve as a source of origin for cracks, fissures and the like to develop in the electrical conductor.

1 Claim, 7 Drawing Figures

U.S.Patent     June 13, 1978     4,094,214

WIRE INSULATION STRIPPING DEVICE

BACKGROUND OF THE INVENTION

1. Field of the Invention

Wire Insulation Stripping Device.

2. Description of the Prior Art

During the past few years electrical conducting wire has come into widespread use in which an electrical conducting member is enveloped in a sheath of extremely tough, resilient electrical insulation. The stripping of a section of such insulation from a free end portion of a wire is extremely difficult.

Insulations of the above mentioned type that are extremely tough and resilient may be thermoplastic resins having a polyurothane base. Commercially available resins that are extremely tough and resilient, and are used for wire insulation, include but are not limited to those presently sold commercially under the trademarks: TEFZEL; KAPTON; TEFLON; MILINE; MYLAR; NYLON; and KYNER.

The severence of sections of electrical insulation of the above described type from the free end portion of a wire is extremely difficult, if not impossible, with prior art insulation stripping tools. Such prior art devices are typified by the wire insulation stripper disclosed and claimed in my U.S. Pat. No. 3,180,184 that issued Apr. 27, 1965 under the title, WIRE INSULATION STRIPPER. When said strippers are used in an attempt to remove a section of insulation from a free end portion of a wire, and the insulation is tough and extremely resilient, the stripping is unsatisfactory, in that only a semicircular cut is made in the insulation by the device. When such a prior art tool is moved parallel to the wire, the unsevered portion of the insulation adjacent the semi-circular cut simply stretches, and it is impossible to obtain a clean break of the partially severed portion of the insulation from the balance of the insulation that remains in an enveloping position on the wire.

A major object of the present invention is to supply a light weight, portable, insulation stripper that permits a sheath of insulation that is tough and highly resilient to have an end portion thereof removed from the metal conductor it envelops, and the removal taking place after a narrow longitudinal section of the insulation is compressed to a thin wall section by use of the present invention. The thin wall section is then broken by moving the tool parallel to the wire in a direction to tension the thin wall section. After the thin wall section is so severed, the end portion of the insulation sheath may be slid from the wire to expose the electrical conductor previously covered by the removed portion.

Another object of the invention is to supply an insulation stripper that permits an end portion of an insulation sheath to be removed from a wire, and without the electrical conductor covered by the sheath being nicked or otherwise defaced during the insulation removal operation.

A still further object of the invention is to supply an insulation stripper that has an extremely simple mechanical structure, is easy and convenient to use, may be readily carried from place to place, and due to its simplicity of structure, may be retailed at a sufficiently low price as to encourage its widespread use for insulation stripping operations.

SUMMARY OF THE INVENTION

The present invention is a device for stripping a section of a cylindrical electrical insulating sheath that is formed from a highly resilient and compressible material from an end portion of a wire to expose the bare metal electrical conductor previously enveloped by the sheath.

The device includes a first elongate rigid member that has a first end and second end portion, and the second end portion being formed into the shape of a hook and serving as a handle that may be grasped by a user of the device. The device also includes a second elongate resilient member that has a first end and a second end portion, with the second member overlying the first member and parallel thereto. The second end portion of the second member is in abutting contact with the first member intermediate the first and second end portions of the latter.

The second member is so shaped that the portion thereof adjacent the first end of the first member is laterally spaced therefrom. The portion of the second member in abutting contact with the first member is secured thereto by conventional means such as welding or the like. The first and second members on first ends thereof include first and second transversely aligned pressure exerting extensions that lie in a common plane and extend toward one another.

The first and second extensions have adjacently disposed first and second end surfaces of substantial width, with the first and second end surfaces being transversely spaced from one another by a distance greater than the thickness of the wire that is to have a section of the insulation removed from an end portion thereof. First and second extensions have transversely aligned semi-cylindrical grooves extending outwardly in opposite directions from the first and second end surfaces, and the grooves each having a radius slightly greater than the radius of the electrical conductor. When the second member is moved from a first to a second position, a narrow, longitudinal section of the insulation is compressed between the first and second grooves to define a thin wall, and this thin wall section capable of being severed when subjected to longitudinal tension. Such longitudinal tension is provided by moving the device in a direction parallel to the wire, and as such movement takes place the thin wall section breaks, with the severed section of the insulation then capable of being slid from the electrical conductor that it previously enveloped.

DESCRIPTION OF THE PREFERRED EMBODIMENT

Figure 1:
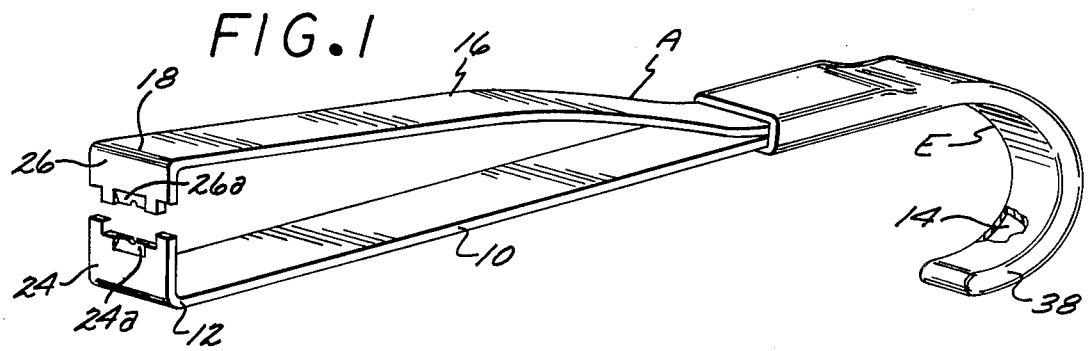
FIG. 1 is a perspective view of the insulation stripping device.
Figure 6:
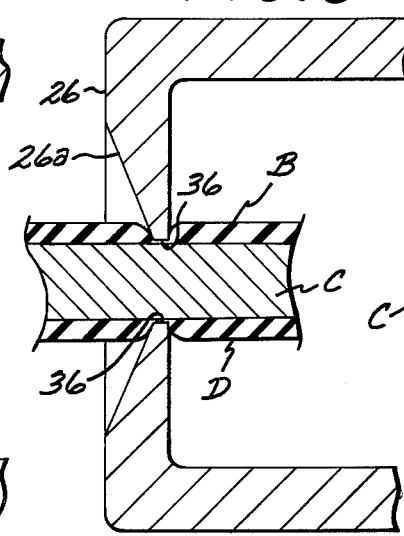
FIG. 6 is the same view as shown in FIG. 5, but with the first and second pressure exerting extensions in pressure contact with an insulation sheath on a wire, and the extensions compressing a longitudinal section of the sheath into an extremely thin wall.
Figure 7:
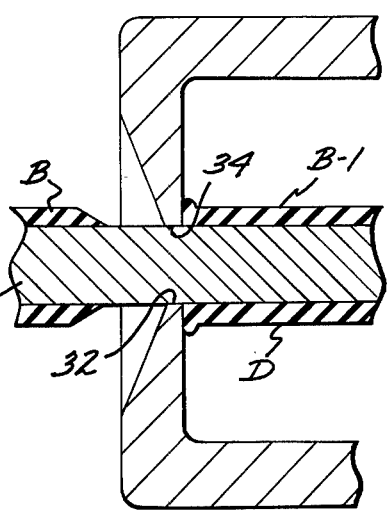
FIG. 7 is the same view as shown in FIG. 6, but with the tool being moved longitudinally and parallel relative to the wire to tension the compressed thin wall section of the insulation to the extent that the tension section breaks, and the tool as it continues to be moved sliding the severed portion of the electrical insulation sheath from the bare metal conductor that it previously enveloped.

The insulation stripping device A shown in perspective in FIG. 1 is adapted to remove an end section of an insulation sheath B from the free end portion of an electrical conductor C as shown in FIGS. 6 and 7, with the insulation B and conductor C in combination defining wire D.

Figure 2:
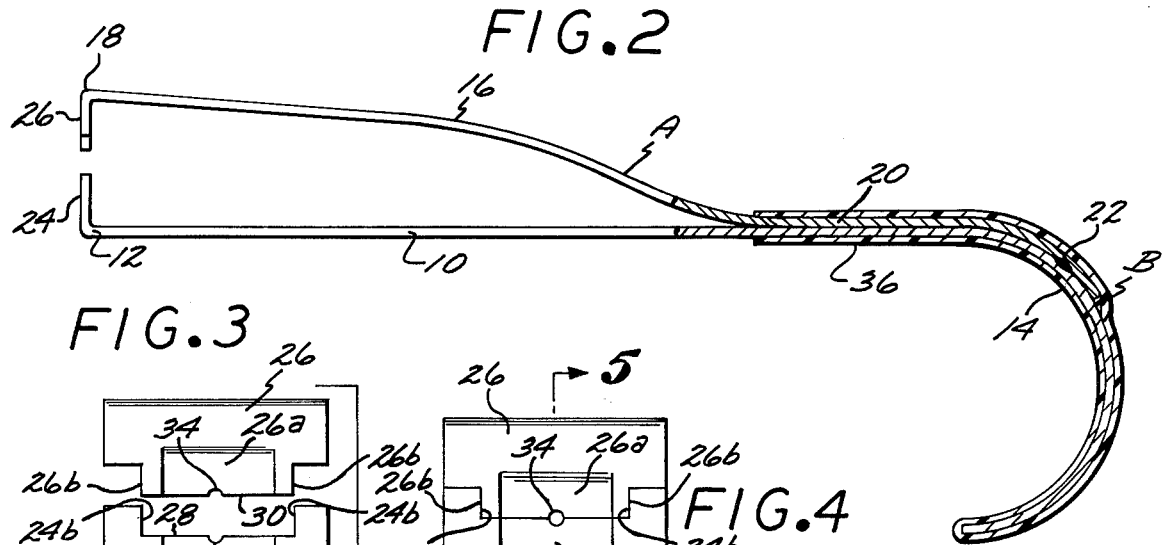
FIG. 2 is a combined side elevational and longitudinal cross sectional view of the device.

The insulation stripping device A as best seen in FIGS. 1 and 2 includes a first elongate metallic member 10 that has a first end 12 and second end portion 14. The device A also includes a second elongate resilient member 16 that has a first end 18 and second end portion 20. The second end portion 20 is in abutting contact with the first member 10 intermediate the first end 12 and second end portion 14 of the latter. The portion of the second member 16 in abutting contact with the first member 10 is secured thereto by suitable fastening means 22, such as welding beads or the like.

Figure 3:
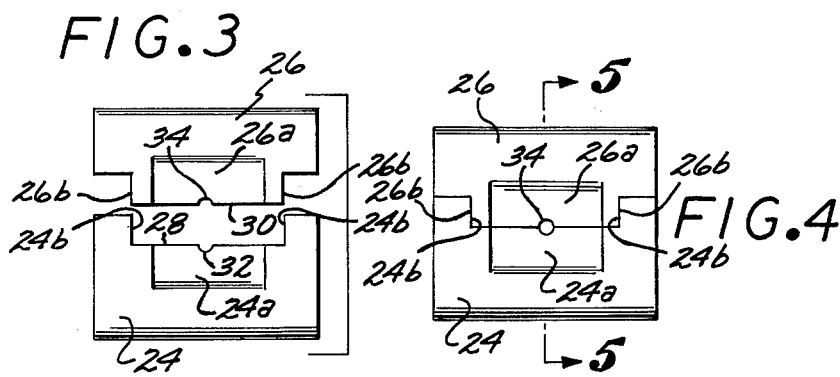
FIG. 3 is a fragmentary end elevational view of the device on the end thereof opposite the handle, and with the first and second pressure exerting extensions separated from one another.
Figure 4:
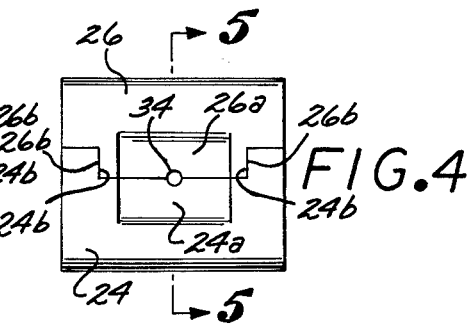
FIG. 4 is another end elevational view of the device, and with the pressure exertng extensions in a second position where a short longitudinal section of the insulation is compressed to have an extremely thin wall.
Figure 5:
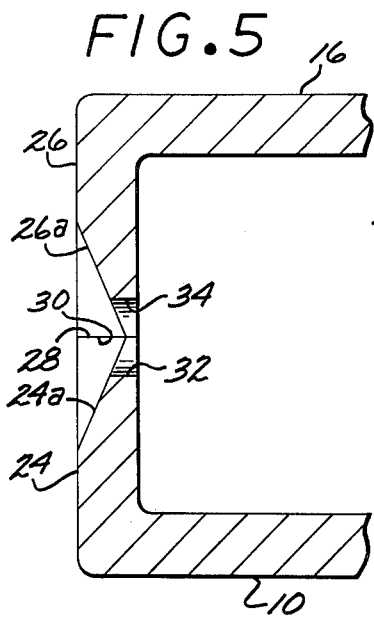
FIG. 5 is a fragmentary, longitudinal cross sectional view of the device shown in FIG. 4 and taken on the line 5—5 thereof.

The first and second elongate members 10 and 12 have first and second pressure exerting extensions 24 and 26 extending inwardly towards one another from the first ends of the members. The second member 16 as may be seen in FIG. 2 is of curved configuration, and to the degree that the first and second extensions 24 and 26 are spaced from one another, when the second member is in the first position as illustrated in FIG. 2. The first and second extensions 24 and 26 have first and second tapered portions 24a and 26a as shown in FIGS. 3 and 4, and these tapered portions developing into first and second edge surfaces 28 and 30, which edge surfaces are of substantial width. The first and second edge surfaces 28 and 30 have first and second semi-cylindrical grooves 32 and 34 extending outwardly therefrom, with the radius of each groove being slightly greater than the radius of the transverse section of the conductor C. When the second member 16 is in the first position as shown in FIG. 2, the first and second edge surfaces are spaced from one another sufficiently as to have the wire D interpose therebetween.

When it is desired to use the device A, an end portion of the wire D is disposed between the edge surfaces 28 and 30 and longitudinally aligned with the first and second grooves 32 and 34. The second member 16 is now moved from the first position shown in FIG. 1 to a second position as shown in FIG. 6, with the edge surfaces that define the grooves 32 and 34 being forced into pressure contact with the insulation sheath B to compress the same and form a longitudinal section thereof into a thin wall section 36. When the device A is moved longitudinally relative to the wire D and parallel thereto, in a direction to tension the wall section 36, the wall section may be tensioned to a degree to cause the same to break. After the compressed thin wall section 36 is broken, the device A continues to be moved longitudinally on the wire D, and in a direcion to separate the severed portion B-1 of the insulation sheath B from the balance of the latter as may be seen in FIG. 7. It will be particularly noted that during the compression of the insulation sheath B to define the thin wall section 36, no portion of the tool is in contact with the conductor C, and the conductor can not be nicked or otherwise damages as a result thereof.

The second end portion 14 of the first member 10 has an envelope 38 of a polymerized resin material or other suitable non-metallic coating covering the same, and the coating 38 and second end portion 14 cooperating to define a handle E that is grasped by the user of the device when the device is being used to strip insulation from the wire D.

To be certain that the semi-circular grooves 32 and 34 are in true alignment when the first and second extensions 24 and 26 are in the position shown in FIG. 4, it is desirable that the first and second extensions each include a pair of laterally spaced tapered faces 24b and 26b. The pairs of tapered faces 24b and 26b are in abutting contact when extensions 24 and 26 are disposed as shown in FIG. 4.

The use and operation of the invention has been disclosed previously in detail and need not be repeated.

I claim:

1. A device for stripping a cylindrical electrical insulating sheath that is formed from a highly resilient and compressible material from an end portion of a wire to expose the bare metal electrical conductor of the latter, said device of the type that includes: first and second elongate members that each have first and second end portions, said second member overlying said first member and angularly disposed relative thereto, said first end portions lying in a common plane, said second end portion of said second member bonded to said first member; first and second rigid extensions extending towards one another and defining said first end portions of said first and second rigid members, said first and second extensions including first and second transverse edges of substantial width that are separated by a distance greater than the diameter of said sheath when said second member is in a first position relative to said second member, with said device being characterized by first and second semi-cylindrical aligned recesses formed in said first and second transverse edges of said first and second extensions, said first and second recesses each having a diameter slightly larger than the diameter of said bare wire, and said first and second recesses of sufficient widths that when said second member is moved to a second position relative to said first member, said first and second recesses compress a cylindrical section of said sheath therebetween to have such a thin wall that said thin wall may be broken and a portion of said sheath slid from said wire to expose a bare end portion of the latter when said device is moved longitudinally relative to said wire in an appropriate direction with said second member in said second position; and first and second rigid engageable means on said first and second extensions that slidably interlock to maintain said first and second recesses in alignment as said first and second recesses pressure contact said insulation sheath to form said thin wall cylindrical section.

* * * * *